US008081205B2

(12) United States Patent
Baird et al.

(10) Patent No.: US 8,081,205 B2
(45) Date of Patent: Dec. 20, 2011

(54) DYNAMICALLY SWITCHED AND STATIC MULTIPLE VIDEO STREAMS FOR A MULTIMEDIA CONFERENCE

(75) Inventors: Randall Baird, Austin, TX (US); Shantanu Sarkar, San Jose, CA (US); Ryan Knotts, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1566 days.

(21) Appl. No.: 11/295,384

(22) Filed: Dec. 5, 2005

(65) Prior Publication Data
US 2006/0092269 A1    May 4, 2006

Related U.S. Application Data

(63) Continuation-in-part of application No. 10/680,918, filed on Oct. 8, 2003.

(51) Int. Cl.
*H04N 7/14* (2006.01)
(52) U.S. Cl. ................ 348/14.08; 348/14.09; 348/14.12
(58) Field of Classification Search .... 348/14.01–14.16; 370/260–261; 709/204, 205, 231
See application file for complete search history.

(56) References Cited

U.S. PATENT DOCUMENTS

| | | | |
|---|---|---|---|
| 4,845,497 A | 7/1989 | Weick et al. | |
| 5,007,046 A | 4/1991 | Erving et al. | |
| 5,058,153 A | 10/1991 | Carew et al. | |
| 5,541,852 A | 7/1996 | Eyuboglu et al. | |
| 5,600,646 A | 2/1997 | Polomski | |
| 5,844,600 A | 12/1998 | Kerr | |
| 5,848,098 A | 12/1998 | Cheng et al. | |
| 5,914,940 A | 6/1999 | Fukuoka et al. | |
| 5,953,049 A | 9/1999 | Horn et al. | |
| 6,078,809 A | 6/2000 | Proctor | |
| 6,128,649 A | 10/2000 | Smith et al. | |
| 6,148,068 A | 11/2000 | Lowery et al. | |

(Continued)

FOREIGN PATENT DOCUMENTS

CA        2537944       11/2010

(Continued)

OTHER PUBLICATIONS

Fox, Geoffrey, et al. "Design and Implementation of Audio/Video Collaboration System", found @http://grids.ucs.indiana.edu/ptliupages/publications/CTS-final.pdf; Jan. 19, 2004.

(Continued)

*Primary Examiner* — Melur Ramakrishnaiah
(74) *Attorney, Agent, or Firm* — Patent Capital Group

(57) ABSTRACT

An end station for a videoconference/multimedia conference is disclosed, where the end station requests, receives and displays multiple video streams. Call control messages request video streams with specified video policies. A static policy specifies a constant source video stream, e.g., a participant. A dynamic policy dynamically maps various source streams to a requested stream and shows, for example, the current speaker, or a round robin of participants. A network access device, e.g., a media switch or a video composition system, mediates between the multi-stream end station and the core conference system. Multi-stream endpoints need not handle the complexity of directly receiving video according to a potentially wide variety of call control protocols, formats, and bit-rates. Multi-stream endpoints decentralize compositing video streams, which increases functional flexibility and reduces the need for centralized equipment.

27 Claims, 6 Drawing Sheets

U.S. PATENT DOCUMENTS

| | | | |
|---|---|---|---|
| 6,285,405 | B1 | 9/2001 | Binford et al. |
| 6,300,973 | B1 | 10/2001 | Feder et al. |
| 6,327,276 | B1 | 12/2001 | Robert et al. |
| 6,463,414 | B1 | 10/2002 | Su et al. |
| 6,535,604 | B1 | 3/2003 | Provencal et al. |
| 6,590,604 | B1 | 7/2003 | Tucker et al. |
| 6,697,476 | B1 | 2/2004 | O'Malley et al. |
| 6,741,250 | B1 * | 5/2004 | Furlan et al. .................. 345/427 |
| 6,989,856 | B2 | 1/2006 | Firestone et al. |
| 7,257,641 | B1 | 8/2007 | VanBuskirk et al. |
| 7,477,282 | B2 | 1/2009 | Firestone et al. |
| 2003/0048353 | A1 | 3/2003 | Kenoyer et al. |
| 2003/0149724 | A1 * | 8/2003 | Chang ........................... 709/204 |
| 2003/0158900 | A1 * | 8/2003 | Santos .......................... 709/205 |
| 2004/0008635 | A1 | 1/2004 | Nelson et al. |
| 2004/0068648 | A1 * | 4/2004 | Lewis et al. ................... 713/153 |
| 2004/0193648 | A1 | 9/2004 | Lai et al. |
| 2004/0263636 | A1 * | 12/2004 | Cutler et al. ............. 348/211.12 |
| 2005/0071440 | A1 | 3/2005 | Jones et al. |
| 2005/0078170 | A1 | 4/2005 | Firestone et al. |
| 2005/0237931 | A1 | 10/2005 | Punj et al. |
| 2005/0237952 | A1 * | 10/2005 | Punj et al. ..................... 370/260 |
| 2006/0087553 | A1 | 4/2006 | Kenoyer et al. |
| 2006/0092269 | A1 | 5/2006 | Baird et al. |
| 2006/0136173 | A1 * | 6/2006 | Case et al. .................... 702/182 |
| 2006/0165083 | A1 | 7/2006 | Lee |
| 2006/0209948 | A1 | 9/2006 | Bialkowski et al. |
| 2007/0002865 | A1 | 1/2007 | Burks et al. |
| 2007/0064901 | A1 | 3/2007 | Baird et al. |
| 2007/0156924 | A1 | 7/2007 | Ramalingam et al. |
| 2009/0160929 | A1 | 6/2009 | Wu et al. |

FOREIGN PATENT DOCUMENTS

| | | |
|---|---|---|
| CN | 1849824 | 10/2006 |
| EP | 1678951 | 7/2006 |
| EP | 1958443 | 8/2008 |
| JP | 2007124702 A | 5/2007 |
| WO | WO 2005/036878 | 4/2005 |
| WO | WO 2007/067236 | 6/2007 |

OTHER PUBLICATIONS

Handley, M., "SDP: Session Description Protocol," Network Working Group, RFC 2327, Apr. 1998, 42 pages; http://tools.ietf.org/pdf/rfc2327.pdf.

Holbrook, H., et al., "Source-Specific Multicast for IP," Internet-Draft, Sep. 7, 2004, 18 pages http://tools.ietf.org/pdf/draft-ietf-ssm-arch-06.pdf.

Rosenberg, J., et al., "SIP: Session Initiation Protocol," Network Working Group RFC 3261, Jun. 2002, 202 pages; http://www.ietf.org/rfc/rfc3261.

Schuizrinne, H., et al., "RTP: A Transport Protocol for Real-Time Applications," Network Group RFC 3550, Jul. 2003, 89 pages; http://tools.ietf.org/pdf/rfc3550.pdf.

USPTO Aug. 4, 2011 Final Office Action from U.S. Appl. No. 11/324,864.

PCT International Search Report (1 page) mailed Feb. 28, 2005 for International Application PCT/US04/32977.

PCT International Preliminary Report on Patentability (1 page) and Written Opinion of the International Searching Authority (9 pages) mailed Apr. 10, 2006 for international Application PCT/US04/32977.

Dogan, S.; Eminsoy, S.; Sadka, A.H.; Kondoz, A.M., "Personalised multimedia services for real-time video over 3G mobile networks," 3G Mobile Communication Technologies, 2002; Third International Conference on (Conf. Publ. No. 489) May 8-10, 2002, pp. 366-370.

Roy, S.; Covell, M.; Ankcom, J.; Wee, S.; Yoshimura, T., "A system architecture for managing mobile streaming media services," Distributed Computing Systems Workshops, 2003. Proceedings. 23rd International Conference on May 19-22, 2003, pp. 408-413.

Wang, Y.; Jae-Gon Kim, Chang, S.-F., Shih-Fu Chang, "Utility-Based Video Adaptation for Universal Multimedia Access (UMA) and Content-Based Utility Function Prediction for Real-Time Video Transcoding," Multimedia, IEEE Transactions on vol. 9, Issue 2, Feb. 2007, pp. 213-220.

USPTO Mar. 16, 2011 Nonfinal Office Action, U.S. Appl. No. 11/324,864.

USPTO Jun. 16, 2011 Response to Mar. 16, 2011 Nonfinal Office Action from U.S. Appl. No. 11/324,864.

State IP Office of the People's Republic of China; Text of the First Office Action; Application No. 200480026120.3; 4 pages, Nov. 3, 2009.

Australian Government letter to Pizzeys, Examiner's First Report on Patent Application No. 2004306740, 2 pages, Jun. 12, 2009.

International Preliminary Report on Patentability (1 page) and Written Opinion of the International Searching Authority (4 pages) mailed Apr. 10, 2007 for International Application No. PCT/US06/34729.

International Preliminary Report on Patentability (1 page) and Written Opinion of the International Searching Authority (4 pages) mailed Apr. 10, 2007 for International Application No. PCT/US06/34729.

International Search Report (1 page) mailed Apr. 10, 2007 for International Application No. PCT/US06/34729.

* cited by examiner

DYNAMICALLY SWITCHED AND STATIC MULTIPLE VIDEO STREAMS FOR A MULTIMEDIA CONFERENCE

RELATED APPLICATION

This application is a continuation in part of, and claims priority from, U.S. patent application Ser. No. 10/680,918, "System and Method for Performing Distributed Video Conferencing," by Scott S. Firestone et al. The '918 application was filed on Oct. 8, 2003, is assigned to the assignee of this application, and is incorporated herein by reference.

BACKGROUND OF THE INVENTION

Videoconference meetings and multimedia conference meetings offer the potential of allowing high quality interpersonal exchanges at low cost and high convenience, particularly as telecommunication cost drops and bandwidth increases. While a videoconference allows participants to see each other, a multimedia conference uses electronic communications including but not limited to: video, audio, instant text messages, and displays from an application program that is shared within the conference. An effective multimedia conference can eliminate the need for participants to travel to a meeting site. This can result, depending on the distances involved, in substantial savings in time, cost, and fuel.

Nevertheless, once a conference includes more than two or three participants, the quality of the participant's experience, and the meaningfulness of their interactions declines. Sometimes this decline is substantial enough to render such an electronic conference an unacceptable alternative to in person participation.

There is a large gap between a typical videoconference and a show with similar content broadcast by a major television network. In order to keep the viewer involved in a broadcast that is a verbal exchange among a handful of participants, television employs numerous camera angles, frequent switches among video signals from these cameras and from other sources, and sophisticated and varying video composition techniques that show multiple video streams simultaneously.

Thus there is a need for conference systems and methods that allow the display of multiple video streams in a flexible and dynamic manner.

BRIEF DESCRIPTION OF THE DRAWINGS

Objects, features, and advantages of various embodiments of the invention will become apparent from the descriptions and discussions herein, when read in conjunction with the drawings. Technologies related to the invention, example embodiments of the invention, and example uses of the invention are illustrated in the following figures:

FIG. 4A shows an embodiment of the invention that follows the session initiation protocol (SIP) and session description protocol (SDP) standards as defined by the Internet Engineering Task Force (IETF). FIG. 4B shows an embodiment of the invention that follows the H.323 and H.245 standards as defined by the International Telecommunication Union Standardization Sector (ITU-T).

DETAILED DESCRIPTION OF EMBODIMENTS OF THE INVENTION

The descriptions, discussions and figures herein illustrate technologies related to the invention and show examples of the invention and of using the invention. Known methods, procedures, systems, circuits, or elements may be illustrated and described without giving details so as to avoid obscuring the principles of the invention. On the other hand, details of specific embodiments of the invention are described, even though such details may not apply to other embodiments of the invention.

Some descriptions and discussions herein use abstract or general terms including but not limited to receive, send, request, generate, yes, or no. Those skilled in the art will appreciate that such terms are a convenient nomenclature for components, data, or operations within a computer, digital device, or electromechanical system. Such components, data, and operations are embodied in physical properties of actual objects including but not limited to electronic voltage, magnetic field, and optical reflectivity. Similarly, perceptive or mental terms including but not limited to compare, determine, calculate, and control may also be used to refer to such components, data, or operations, or to such physical manipulations.

Figure 1A:
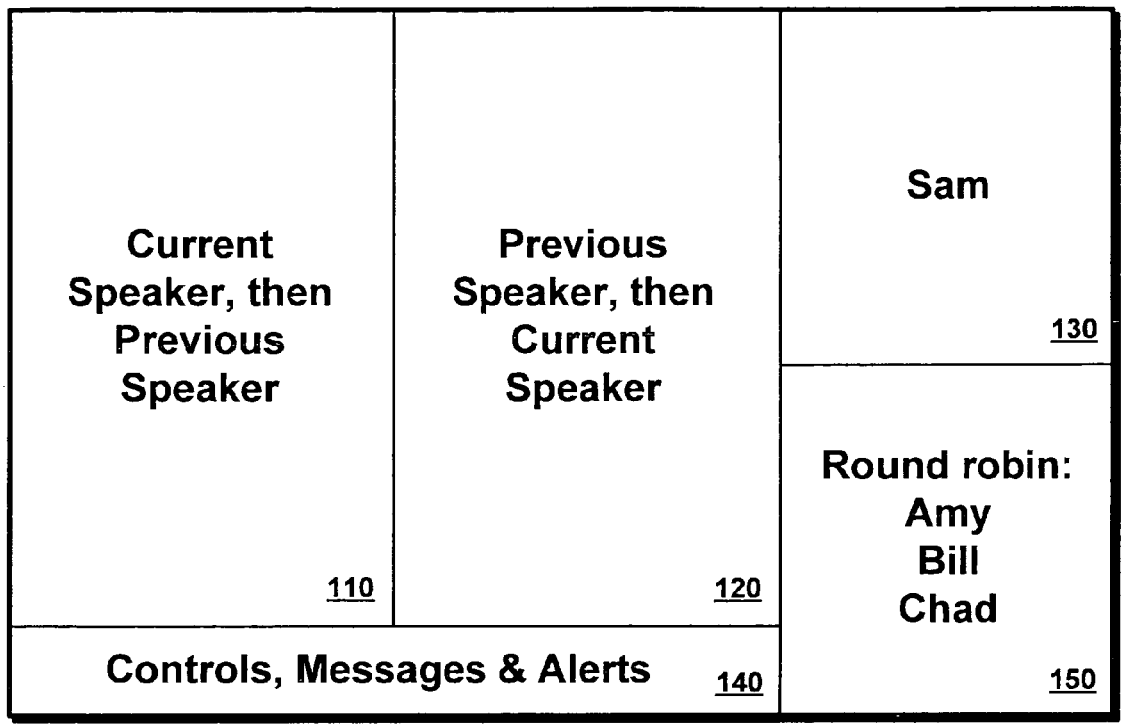
FIGS. 1A and 1B show examples, according to an embodiment of the invention, of screen displays on a multi-stream end station participating in a conference.
Figure 1B:
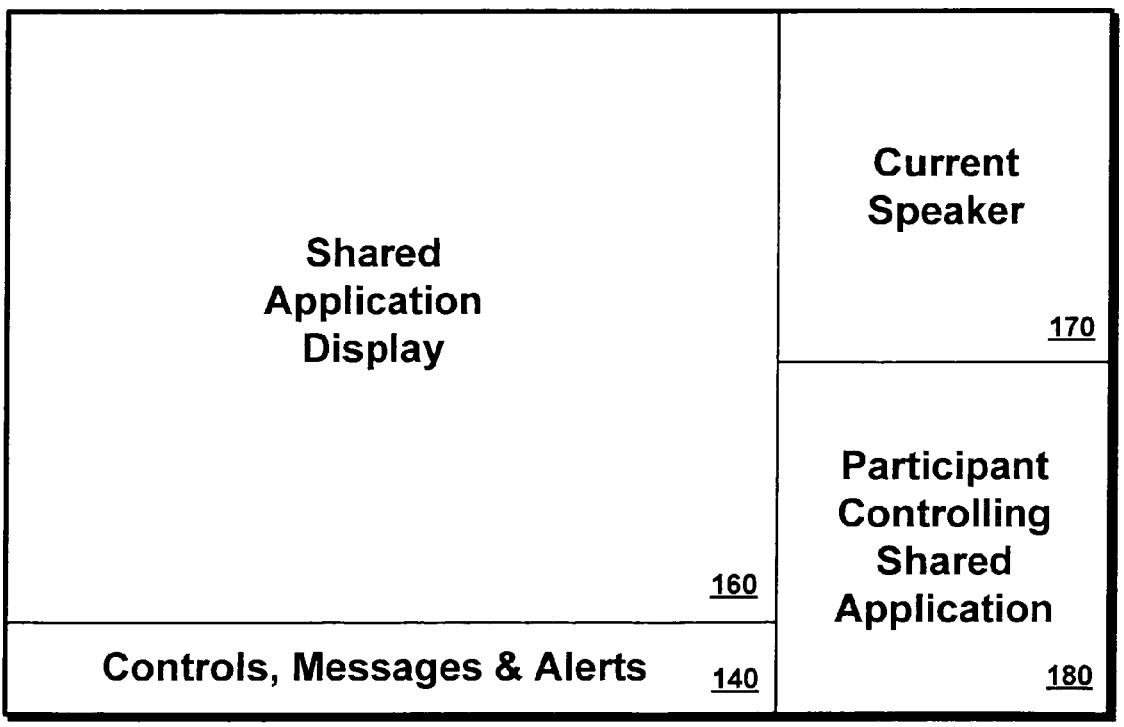

FIGS. 1A and 1B show example screen displays, according to an embodiment of the invention. These screen displays are produced by end station participating in a conference that uses video policies.

In FIG. 1A, display device 100 is partitioned into windows 110, 120, 130, 140, and 150. The selection of window position, size, and content may be standardized across all participants within a conference, or may be customized by each user. Or, the display may default to a standard configuration but allow each user to change the configuration. Dynamic configuration changes are allowed in some embodiments of the invention. For example, during a conference session the user may use the controls within window 140 to alter the configuration shown in FIG. 1A to the configuration shown in FIG. 1B. This is advantageous over a network broadcast, for example, in which the video changes frequently, but the viewer has no control over those changes.

Display 100 is part of an end station that participates in the current conference. As part of the process in which this end station enters into the conference, the end station sends conference control messages. Specifically, in order to display windows 110 and 120, two video streams are necessary. The end station requests one video stream specified to be controlled by the dynamic policy of showing the current speaker's video stream. Also, the end station requests another video stream specified to be controlled by the dynamic policy of showing the previous speaker's video stream.

In response to these requests, the conference sends the two requested video streams to the end station. Because these are dynamic video streams, the conference includes a monitor function that determines which participant is speaking. When the current speaker changes, this monitor sends appropriate conference control messages that activate the video streams associated with the current and previous speakers, and cause these activated video streams to be sent as the appropriate requested video streams.

In the case of dynamic video stream policies, this mapping of source video stream to requested video stream may change, and typically does change, during the course of the conference. This mapping provided by the video stream policy specifies, at each point in time during the conference, which of the source video streams within the conference is used for the requested video stream.

Window 130 of display 100 shows the participant named Sam. As part of entering the conference, the end station sends a conference control message requesting a video stream controlled by the static policy of showing Sam. Sam's video stream may be, but need not be, identified by Sam's roster identifier (ID), which is a unique identifier associated with each participant in a conference. The roster ID used is typically, but need not be, derived from a uniform resource indicator (URI) of the participant, according to the Session Initiation Protocol (SIP) standard. SIP is defined by the Internet engineering task force (IETF), specifically, by IETF request for comments (RFC) 3261, 3262, 3263, 3264, and 3265. In particular, RFC 3264 describes the offer and answer protocol used when an end station enters a conference.

Window 150 of display 100 shows a video stream that rotates round robin among three other participants in the conference, specifically, Amy, Bill, and Chad. As part of entering the conference, the end station sends a conference control message requesting a video stream controlled by the dynamic policy of showing each participant displayed in sequence for a specified period of time. Typically, but not necessarily, a simple time out monitor is used to activate the next video stream within a round robin dynamic policy.

Other video stream policies rotate round robin among all conference participants, or all participants other than those who are viewing the display. Yet other video stream policies skip over a participant if, when the time comes for their turn in the video stream, that participant is already being shown in another window on a particular end station.

Windows 110 and 120 show, in a coordinated manner, the current and previous speakers in the video conference. These windows toggle, or alternate, which shows the current speaker and which shows the previous speaker so as to avoid unnecessary discontinuities. Significant viewer distraction could result if whenever a different participant starts to talk, the image of the person who just stopped talking jumped from window 110 over to window 120.

An example of this coordination is shown in Table 1, which assumes a conference that includes source video and audio streams for at least four participants:

TABLE 1

Coordinated Current and Previous Speaker Windows

| Event | Window 110 | Window 120 |
| --- | --- | --- |
| Participant Alice starts talking, and is recognized as the current speaker. | Alice's video stream appears. | Window retains previous contents, for example, it stays blank. |
| Participant Bob starts talking and is recognized. | Alice's video stream continues to be displayed. | Bob's video stream appears. |
| Chris starts talking. | Chris' video stream replaces Alice's stream. | Bob's video stream continues to be displayed. |

TABLE 1-continued

Coordinated Current and Previous Speaker Windows

| Event | Window 110 | Window 120 |
| --- | --- | --- |
| Dave starts talking. | Chris' video stream continues to be displayed. | Dave's video stream replaces Bob's stream. |

Another example of video stream coordination is shown in Table 2. This conference assumes the same four participants, but applies to the end station from which Chris is participating in the conference. In this embodiment of the invention, the current and previous speaker policies are interpreted such that the video streams sent to the end station never include the participant on that end station, which can be distracting. Rather, when a participant associated with a particular end station speaks, the windows that involve speaking order continue to show the video stream to which they were previously mapped.

TABLE 2

Current and Previous Speaker Windows that Omit Participants Associated with a Particular End Station

| Event | Window 110 on Chris' End Station | Window 120 on Chris' End Station |
| --- | --- | --- |
| Participant Alice starts talking, and is recognized as the current speaker. | Alice's video stream appears. | Window retains previous contents, for example, it stays blank. |
| Participant Bob starts talking and is recognized. | Alice's video stream continues to be displayed. | Bob's video stream appears. |
| Chris starts talking. | Alice's video stream continues to be displayed - Chris' image does not display here because this is Chris' end station. | Bob's video stream continues to be displayed. |
| Dave starts talking. | Dave's video stream replaces Alice's stream. | Bob's video stream continues to be displayed. |

Window 140 of display 100 contains controls for the current conference, along with any number of icons, buttons, status displays, or messages that may or may not relate to the conference. These include, but are not limited to: a "you've got new mail" icon; a window for an instant message dialog possibly, but not necessarily, with a conference participant; a calendar appointment reminder; or the current date and time.

In FIG. 1B, display device 100 is partitioned into windows 140, 160, 170, and 180. Window 140 is described with regard to FIG. 1A.

Window 160 shows a display generated by sharing a particular application program within the conference. This program is typically, but not necessarily, an application running on the personal computer (PC) of a particular participant. The information displayed by each such program is made available to the conference as a conference display stream, which is typically not conveyed in a video format. Rather, application program display information may be conveyed in the video graphics array (VGA) format, among other possible formats. Window 160 is set up by the end station requesting a video stream with a static policy requesting a particular application program.

Window 170 shows the current speaker within the conference. Window 180 shows the participant within the conference who is currently controlling or providing input to the shared application. This is set up as a stream controlled by a dynamic policy, and causes the conference to establish a monitor to detect which of the participants is currently in control of the application.

Various embodiments of the invention are used to participate in conferences of various sorts. In addition to the audio and video streams of a typical videoconference, conference participants may share information via instant messaging or text messaging. Such messages may be generally available to all or most conference participants, or may be a private side conversation limited to two participants, or a few specified participants. Conference participants may also share information by sharing an application program. One or more of the participants control the shared application, but all or most of the participants see a display that is generated by the shared application. Such shared applications include but are not limited to, showing a "slide" presentation being made by a participant.

Typically, but not necessarily, a conference includes, and is implemented by means of one or more of: call control messages that manage the conference; source video streams (e.g., streams that show each participant and originate from that participant's end station); requested video streams (e.g., the current speaker); source audio streams (e.g., the voice of each participant); a conference audio stream (e.g., the mixed audio of each participant); text messages or instant messages; and the input streams and display streams that are associated with shared application programs.

Some conferences include "participants," as the term is used with respect to that conference, that are not a human being. For example, a conference may include as a send-only video camera in the lobby of a building, or a camera showing the area within a stock exchange where particular stocks are traded. Other participants may be receive only, including but not limited to: recording devices for audio/video or other conference streams; or facial recognition systems.

Video streams controlled by static policies originate from a single end station for the duration of a conference. Any video stream with a static source can be a static video stream within a conference. Various embodiments of the invention allow one or more of the following static policies to be associated with a requested video stream:

Requesting the video stream associated with a particular participant in the conference. The participant may be, but need not be, specified by using a roster identifier or entry encoded as a universal resource indicator (URI) according to a version of the SIP standard, encoded as a domain name server (DNS) identifier or encoded as the Internet protocol (IP) address of the end station with which the participant is associated.

Requesting a particular one of multiple video streams associated with a particular conference participant. For example, a building lobby may include several video cameras, or a person speaking on a stage may have a face/close up video stream and a whole body/whole stage video stream.

Requesting the video display stream that is generated by a particular application program running on a computer system within the conference. The application program may be, but need not be, specified by including the SIP roster entry of the participant operating the application program, or by using the IP address of the host on which the application program runs.

Video streams with dynamic control policies typically originate from multiple end stations at different points in time during a single conference. Any video stream whose source end station may vary during a conference has a dynamic video policy. More specifically, a dynamic video policy specifies a mapping between whatever requested video streams specify that particular policy and the source video streams within the video conference that are used to construct the requested video streams.

Occasionally during a particular conference session, the source video stream that a particular dynamic policy maps to the requested video streams that request that policy does not change. This may occur, for example, if one participant controls the shared application throughout an entire conference session. A video stream policy can be considered to be a "dynamic" policy whenever the source stream could change during a conference session, regardless of whether or not such a change occurs within a particular conference session.

Various embodiments of the invention include, but are not limited to, one or more of the following dynamic policies to be associated with a requested video stream:

Requesting the video stream of the participant who is the current speaker within the conference.

Requesting a video stream of the Nth most recent speaker, where N=1 requests the current speaker, N=2 requests the speaker immediately previous to the current speaker, N=3 requests the speaker immediately previous to that speaker, and so on.

Requesting a video stream of the participant who is currently using or controlling a particular application program within the conference.

Requesting a video stream selected by a moderator. In some embodiments of the invention, a conference may include one or more moderators, each of whom may control one or more video streams. Such a moderator may be, but need not be, a lecturer who does much of the talking in the conference and occasionally selects audience members to ask questions or make comments. Alternatively, a moderator may be a silent director or facilitator who determines the current source of this video stream but does not speak or appear in the conference. The conference system can support, in the same conference, zero or more moderated video streams (whether from one moderator or from multiple moderators) by giving each stream that is selected by a moderator a unique identifier or label. In this case, an end station may request none, some, or all of these streams by specifying the labels of the streams that are desired.

Requesting a video stream that is a round robin display of a set of the participants, that is, a stream that displays a selected one of the set of participants and changes which participant is selected over time during the conference. The set may or may not include all of the participants. A timer may be, but need not be, used to determine when to advance to the next person in the round robin. In some embodiments of the invention, if the next participant in the round robin is currently displayed via some other video stream that the endpoint requesting this policy is currently receiving, then they are skipped over and this video stream advances to the next participant in the set.

Requesting the video stream of the particular participant whose video stream has the most image motion, the second most image motion, etc., among all the source video streams within the conference.

Requesting the video stream of the particular participant whose video stream has the least image motion, the second least image motion, etc., among the video streams.

Requesting the video stream of a particular participant, or set of participants, when any of those streams show motion greater than a threshold. For example, show any of the video streams of any of the lobbies of the building, whenever one of those streams is moving. Various embodiments of the invention perform various actions when an end station requests to receive N video streams with this policy and less than N, or more than N, source video streams meet the criteria. For example, when three source video streams show more motion than the threshold, then a round robin of those source streams can be shown with a text overlay that lists the names of all three streams.

Requesting the video stream of a particular "participant" when an activity associated with that participant occurs; for example, show the outside front door video stream whenever a nearly doorbell button is pressed. This policy could also be based on measurements of an activity, for example, show the video stream associated with the portion of a stock exchange floor where the currently most active stock is being traded.

Requesting the video stream associated with a particular participant based on a location measurement of one or more persons or objects including, but not limited to, a global positioning system (GPS) sensor associated with a conference participant. For example, when participant X is leading in a race, show a video stream from his vehicle, or show a video stream of his spouse (who is watching the race). Or, show a mobile conference participant the video stream of whichever other conference participant is currently the $N^{th}$ closest. Note that the conferences with which embodiments of the invention are adapted to work need not be strictly business or commercial; rather, they may include, or focus on, social networking.

Any or all of the above policies may be interpreted relative to the video streams that are currently being received and displayed by a particular end station. For example, under certain conditions the current speaker video stream that is sent to a particular end station may continue to show the previous speaker. This may occur when the participant using that end station starts talking, or if Sam starts talking but is being shown in a different window on that particular end station because of a motion related policy or a round robin policy.

Various embodiments of the invention support various video stream policies. A particular embodiment of the invention need not support all the video policies mentioned herein. Also, it is within the scope of the invention for embodiments to support video stream policies other than those mentioned herein.

Figure 2:
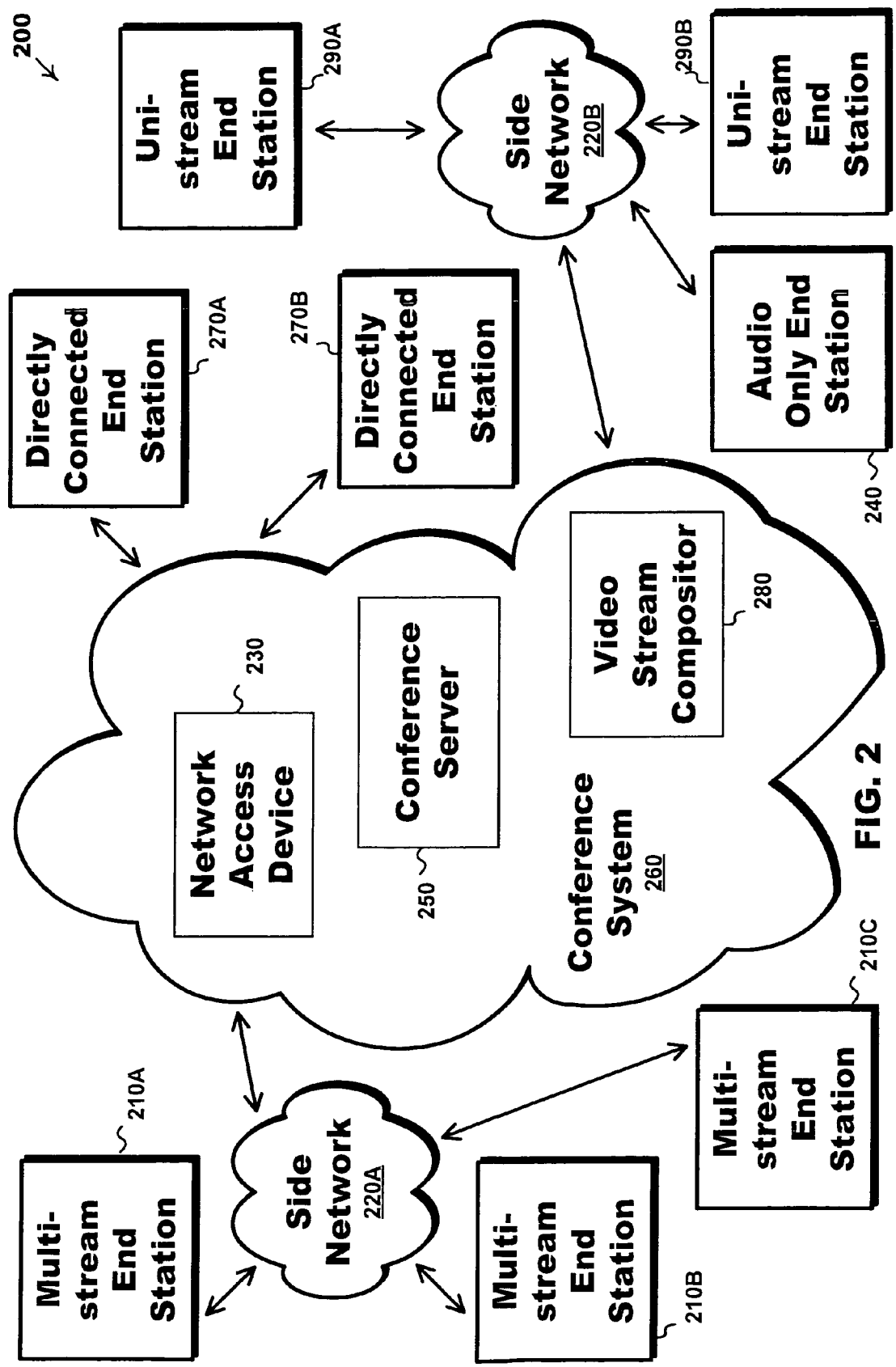
FIG. 2 shows an example, according to an embodiment of the invention, of a conference system including uni-stream end stations, multi-stream end stations, and directly connected end stations.

FIG. 2 shows an example of a conference network according to an embodiment of the invention. Those skilled in the art will appreciate that many conference networks and many core conference systems may be employed within the scope of this invention and in various ways of using this invention.

Conference network 200 includes a core conference system 260, two side networks 220, and a variety of end stations. These end stations include: three multi-stream end stations 210, which couple to conference system 260 via side network 220A; two uni-stream end stations 290, which couple to system 260 via side network 220B; and two end stations 270 that are directly connected to system 260.

Core conference system 260 provides a variety of conference services to the end stations and includes: a network access device 230; a conference server 250; a video stream compositor 280; and a core conference network that links these core system devices to each other and to the side networks 220.

Conference network 200 also includes an audio only end station 240 which couples to core conference system 260 via side network 220B. For clarity, the descriptions herein sometimes omit the handling of audio streams or the physical and functional audio components used in, or in conjunction with, the invention. Nevertheless, an audio stream typically accompanies each video stream. Techniques and devices for handling these audio streams, including mixing the input audio streams, are known in the art.

The core conference network and the side networks 220 are typically, but not necessarily, a packet based network that follows a version of the Internet protocol (IP). The core conference network typically, but not necessarily, conveys video streams as a combination of multicast and unicast RTP streams, according to RFC 3550. Side networks 220 typically, but not necessarily, convey video streams as unicast RTP streams. In some embodiments of the invention, the entities described here as the core conference network and the side networks 220 may include, or be implemented using, some of all of the same physical network links or devices.

Core conference system 260 may be implemented using a single physical network or computing device. Alternatively, in other embodiments and applications of the invention, the functions of any or all of network access device 230, conference server 250, or video stream compositor 280 may be distributed among multiple devices that are within, or that are coupled to, conference system 260.

Core conference system 260 collectively receives the call control messages from the end stations. Some of these call control messages request the establishment of video streams from the end stations to the conference service, which are referred to as "source video streams." Other call control messages request the establishment of video streams from the conference service to the end stations, which are referred to as "requested video streams." Some or all of the requested video streams have a video policy request associated with each stream. These video policy requests may be for a static video policy, or for a dynamic video policy.

Based on the video policies requested, core conference system 260 implements specific mappings of source video streams to requested video streams. The mapping of streams using static policies involves identifying the source stream referred to in the static policy and using it to construct the requested video stream to which the policy applies. For example, a static policy requesting the stream bob@xyz.com will cause the video data coming from the participant associated with the URI bob@xyz.com to be sent to the destination stream with that policy.

When a requested video stream has a dynamic policy, the mapping of that stream to the appropriate source video stream requires core conference system 260 to monitor video streams, audio streams, or activities that are likely to vary during the conference. As required by the particular video stream policies used within a particular conference session, system 260 monitors one or more time varying properties. These may include, but are not limited to: a property of at least one of the source video streams (e.g., motion); a property the audio streams associated with one or more of the source video streams (e.g., who is speaking); or measurements of activities associated with the conference (e.g. a participant's position, or the "ring" of a door bell). By monitoring the appropriate time-varying properties, core conference system is able to select the proper source video stream to use for each requested video stream at each instant in time.

For example, a policy that specifies that a requested video stream contain the most recent speaker causes core conference system 260 to monitor its audio mixing sub-system to identify the loudest speaker at any point in time, and to construct the requested video stream using data from the source video stream associated with the loudest speaker at that point in time. As another example, a policy that specifies that a requested stream contain the participant controlling a shared application causes the conference service to monitor the application sharing system to identify the participant in control at any point in time, and to construct the requested video stream using data from the source video stream associated with that participant.

Directly connected end stations 270 connect directly to core conference system 260. Because of this direct connection, stations 270 interpret and participate in the call control protocols and techniques used within system 260. Stations 270 also participate in the video streaming protocols and techniques used within system 260 and, in some cases, must be able to monitor streams in a manner similar as that described for the conference service. These protocols and techniques may be complex and may impose substantial burdens on directly connected end stations 270, both in terms of design complexity and in terms of processing capability.

For example, the video streams conveyed within core conference system 260 may be multicast, unicast, or some mixture thereof. These video streams may all use the same video encoding format and quality characteristics, or they may be a mixture of various formats and qualities. In some cases, the heterogeneity of conference system 260 is planned, in other cases it is imposed by the economic need to continue to use older models of conference devices even though newer models are available.

In contrast to directly connected end stations 270, uni-stream end stations 290 are capable of receiving only a single video stream. A uni-stream end station 290 may not be capable of requesting what video stream, or what video stream policy, is desired at that end station. Thus, video streams sent to these end stations are known as "destination video streams."

Uni-stream end stations 290 participate in the conference as mediated by network access device 230 and the side network 220B. If more than one source video stream is to be viewed simultaneously on a particular station 290, then a video stream compositor 280 may construct a single, unified destination video stream using multiple source streams, based on a default or configured policy, rather than a requested policy.

Only limited design complexity and processing capability is required in a uni-stream end station 290. At the minimum, each station 290 is required to transmit to the conference system which conference the participant represented by the end station wishes to participate in, and to receive and display a single video stream. Typically, uni-stream end stations 290 also originate and transmit a video stream that shows the participant represented by the end station. Some uni-stream end stations do not specify which of the video streams within the conference their participant is interested in, because a default set of streams is set up for the conference or because the compositor may be configured to only provide a single unified video stream for each conference.

The relative simplicity of uni-stream end stations 290 is achieved by imposing substantial burdens on video stream compositor 280. Converting multiple input video streams into a unified video stream may include fully decoding each of the input video streams, sizing and positioning each input stream while rendering it into a video image buffer, and then re-encoding the image buffer into the unified video stream. Such conversion may also include trans-coding, that is, converting source video streams having one or more sets of format characteristics into a unified video stream having yet a different format. Such conversion may further include trans-rating, that is, converting source video streams of one bit rate into a unified video stream of another bit rate.

For example, if one source video stream is sent according to the ITU H.263 encoding while another source video stream is sent according to the ITU H.264 encoding, then video stream compositor 280 trans-codes, or converts, one of these source video stream into the format expected by the uni-stream end station. Alternatively, or additionally, various source video streams may have various different bit rates, in which case the compositor 280 trans-rates one or more of the source video streams into a unified video stream having a bandwidth acceptable to the uni-stream end station.

One type of video stream compositor that is known in the art is called a continuous presence system. In such a system, a conference of four participants, for example, is composited into a video stream with 4 windows, each of which continuously shows one of the participants. Video stream compositors are also known as video composition systems or video multipoint control units (MCUs). These include, but are not limited to, the Cisco IP/VC 3540 MCU.

Multi-stream end stations 210 participate in the conference as mediated by a network access device 230. Access device 230 and side network 220A couple each station 210 to core conference system 260. Each multi-stream end station requests the video streams that are of interest to the participants using that end station, receives the video streams requested as separate streams, and simultaneously displays the received video streams. Typically, each stream occupies one window within a single display device, as described with respect to FIGS. 1A and 1B. However, this not necessarily the case, that is, various embodiments of the invention may have various numbers and types of display devices.

The design complexity and computational capability required in a multi-stream end station 210 are an advantageous middle ground or sweet spot design between that of a directly connected end station 270 on the high end, and that of a uni-stream end station 290 on the low end. On the one hand, decoding multiple video streams requires considerable computational capability, although this disadvantage is offset by the fact that computational circuitry continues to decline in cost.

On the other hand, network access device 230 isolates the multi-stream end stations from the complexity of interfacing directly with core conference system 260. For example, network access device 230 offloads the multi-stream end stations 210 by interpreting the video stream policies that are requested by each multi-stream end station 210 and deciding which of the various source video streams within conference system 260 are used to construct the requested video streams that are sent to each end station 210. Device 230 also decides how to change which of the source video streams map to, or are used to construct, each of the video streams requested by each end station 210.

In addition, multi-stream endpoints may or may not be capable of receiving different video formats or bit rates. Further, they may or may not be capable of receiving different video formats or different video bit rates on the same requested video stream at different times during the conference. When the video policy associated with a requested stream is a dynamic policy, then the source of the stream usually changes over time during the same conference session. Each network access device 230 constructs the requested video streams by providing any trans-coding, trans-rating, or both, of the requested video streams when required by the limitations of the multi-stream end stations which are supported by that device 230. Otherwise, device 230 constructs the requested video streams by re-transmitting or readdressing, or relaying the appropriate source video stream onto the appropriate end station.

Multi-stream end stations 210 advantageously offer the conference participants who use them substantial flexibility to tailor their experience of the conference to their needs and preferences. In part, this flexibility is achieved by the variety of video stream policies supported in various embodiments of the invention.

This advantageous flexibility is also achieved by the reconfiguration capability of some embodiments of the invention. A user can, during a conference, reconfigure each display device on his end station as to how many windows are used to display conference streams, and for each of these windows can reconfigure its size, its position, and its depth relative to other display windows. Further, the participant can, during a conference, change which video stream policy is associated with each window.

In some embodiments and applications of the invention, one or more of network access devices 230, directly connected end stations 270, or video stream compositors suppress transmission of uninteresting or un-requested video streams within core conference system 260. Each end station 270 typically originates one or more source video streams within the conference. Each network access device 230 or video stream compositor 270 typically receives from a side network 220 a number of source video streams that originate from the end stations on that side net. Such intermediary devices may monitor whether or not any end station within the conference has a video policy that currently displays each of the source video streams that the intermediary device originates or retransmits. If a particular source video stream is not currently being used to construct any of the currently active requested video streams, then that source video stream may be suppressed by the network access device 230, thereby saving computational and bandwidth resources within the conference system 260.

Various embodiments of the invention may be used with various configurations of conference systems. Possible conference systems include, but are not limited to, those including: at least one network access device and no video stream compositors; at least one video stream compositor and no network access devices; or at least one of each type of conference device. Similarly, various embodiments of the invention may be used with conference systems with one or more conference servers. Further, the terms "conference server," "network access device," and "conference server" refer to functional capabilities or roles, and any or all of these capabilities may be implemented on separate physical devices or combined onto or hosted on one or more multipurpose physical device.

Each network access device or video stream compositor can use various techniques to determine the number of end stations that the device is to support, and the capabilities and requests of each end station. These techniques include local control messages, protocols, and negotiations. These techniques may, but need not, follow standards such as SIP and SDP, or H.323 and H.245, the use of which to connect a multi-stream end station to the conference is described with respect to FIGS. 4A and 4B respectively.

Similarly, the devices that connect to core conference system 260 may use various techniques to communicate call control messages, source video streams, requested video streams, source audio streams, conference audio streams, and the like. These techniques may, but need not, follow standards such as SIP and SDP; H.323 and H.245; or protocols and formats that are proprietary to a particular vendor of conferencing equipment.

In some embodiments of the invention, some of the call control messages contain requests for video streams, specifications of the video policies of requested, or both. That is, these requests and specifications follow, are compatible with, or include information embedded within the same message formats and protocols as the call control messages that manage the conference.

Figure 3:
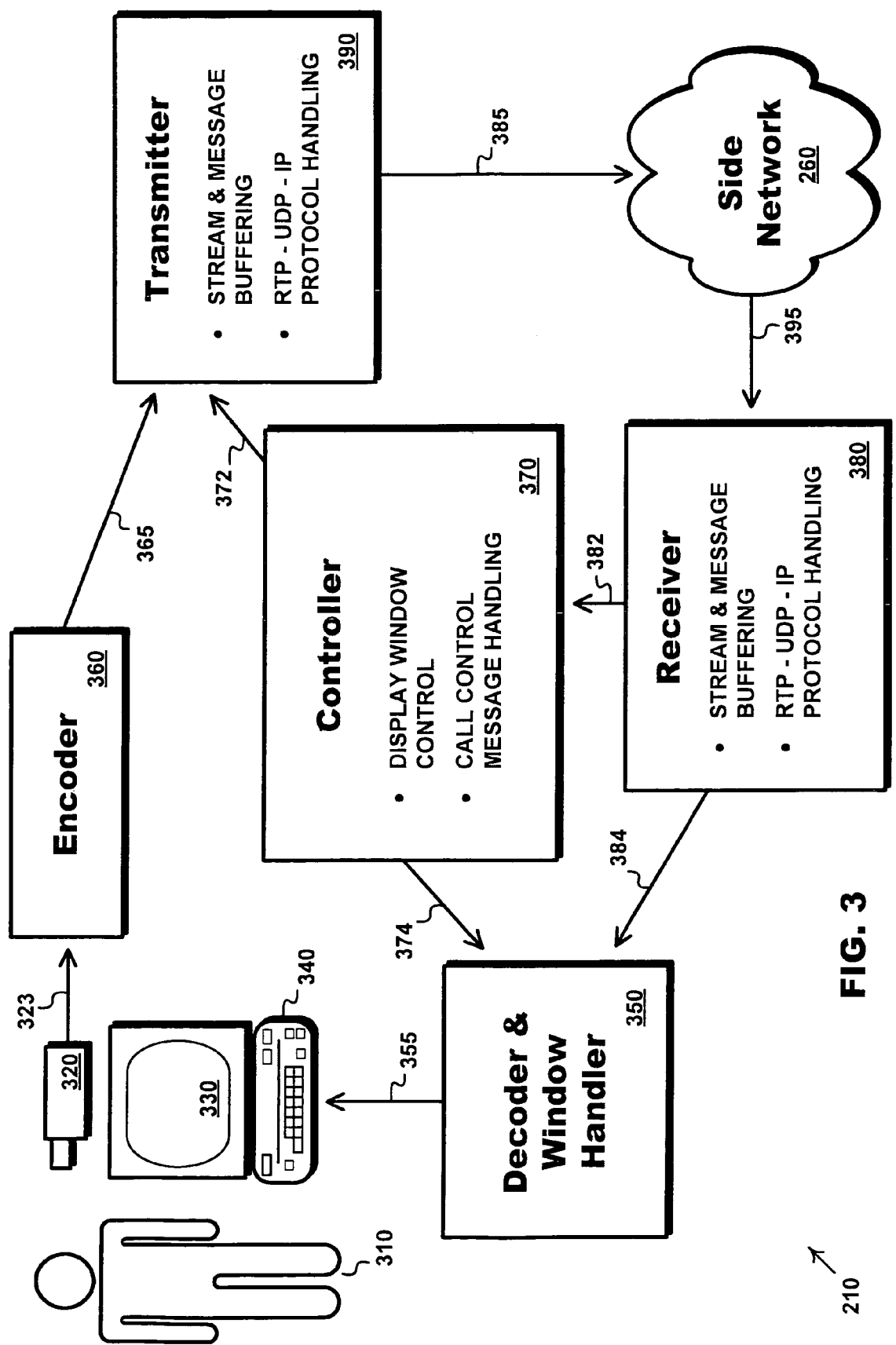
FIG. 3 shows the functional components and their interconnections within a multi-stream end station according to an embodiment of the invention.

FIG. 3 shows the functional components and their interconnections within a multi-stream end station according to an embodiment of the invention. Multi-stream end station 210 includes a video camera 320, a display 330, a user input device 340, a decoder and window handler 350, an encoder 360, a controller 370, a receiver 380, and a transmitter 390. The receiver 380 and transmitter 390 interface with network 399, which in some applications or embodiments of the invention is side network 220A. The video camera 320, display 330, and user input device 340 enable the end station user/conference participant 310 to interface with multi-stream end station 210, and thus to interact with the other participants in the conference. Multi-stream end station 210 and side network 220A are also described with respect to FIG. 2.

User input device 340 may include any combination of buttons, keyboards, pointing devices, and the like. Via device 340, user/participant 310 specifies the window sizes, shapes, positions, and overlaps (if any) as user commands that are interpreted by controller 370.

Controller 370 is responsible for controlling the windows within display 330 according to the user commands, the previous setting, or the applicable defaults. Controller 370 provides window parameters 374 to decoder and window handler 350. Window parameters 374 specify the size and position of each window used to display a video stream. Some embodiments of the invention also assign each window a depth parameter specified relative to the depth of the other windows being displayed at the same time. Thus, in case of overlap among windows, the window with a shallower depth is displayed in the overlapping region.

Controller 370 is also responsible for generating outgoing call control messages 372. Some of the messages 372 request the video streams and policies that are to be displayed on display 330, according to commands that user 310 enters via input device 340 or according to default setting for the end station, or default setting for the conference. Outgoing call control messages 372 are relayed to network 399 by transmitter 390, which may pack a single message into a number of packets appropriate for transmission. Controller 370 is also responsible for handling incoming call control messages 382, which are relayed from network 399 via receiver 380. Receiver 380 may extract a single message 382 from multiple packets.

Receiver 380 receives incoming packets 395 from network 399. Incoming packets 395 include representations of incoming call control messages 382 and representation of one or more requested video streams 384. The receiver conveys these streams on to decoder and window handler 350. Receiver 380 provides stream buffering and transport protocol handling for the incoming call control messages 382 and for the requested video streams 384. The call control messages typically, but not necessarily, rely on underlying transport protocols, which may include, but not be limited to, handling of: the real time transport protocol (RTP), the transmission control protocol (TCP), or the user datagram protocol (UDP). In some embodiments of the invention, each video stream transmitted on network 399 is a unicast RTP stream, according to RFC 3550.

Decoder and window handler 350 receives the requested video streams 384, decodes them, and then sizes and positions the decoded video streams into windows, as controlled by window parameters 374. Each of the requested video streams that is received from the conference is displayed simultaneously, although it is possible for the user to specify the size, position, and relative depth of the currently active windows such that one or more of the received video streams even though displayed is partially, or even totally, obscured from being seen on display 330. Decoder and window handler 350 provides display signals 355 to display 330.

Video camera 320 captures a video image 323 of user/participant 310, and provides this image to encoder 360. Encoder 360 encodes this video image into an outgoing video stream 365. Transmitter 390 receives this outgoing video stream and makes it available to the conference via network 399 as a source video stream. Packets 385 sent from transmitter 390 to network 399 include this source video stream and outgoing call control messages 372.

In some embodiments of the invention, the end station includes multiple video cameras that are used to generate multiple source video streams. Such multiple video streams may be multiple images (e.g., close up, profile, etc.) of a single user/participant 310. Or, they may be one image of multiple users/participants who participate in the conference in the same room or via the same end station. Or they may be source video streams that are independent of the users of an end station but are hosted on the end station device.

Figure 4A:
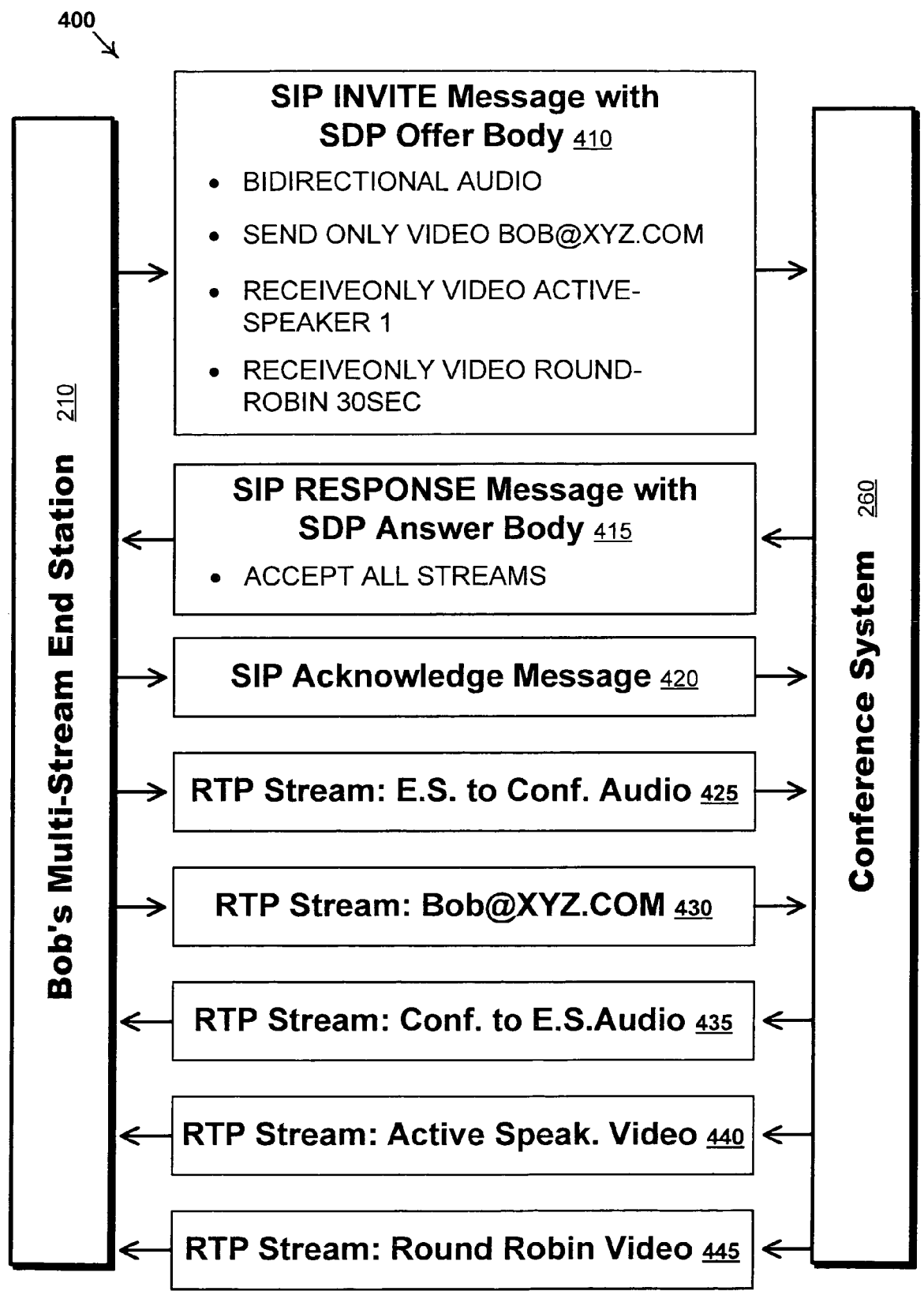
FIGS. 4A and 4B show the series of call control messages that connect an end station with a conference.
Figure 4B:
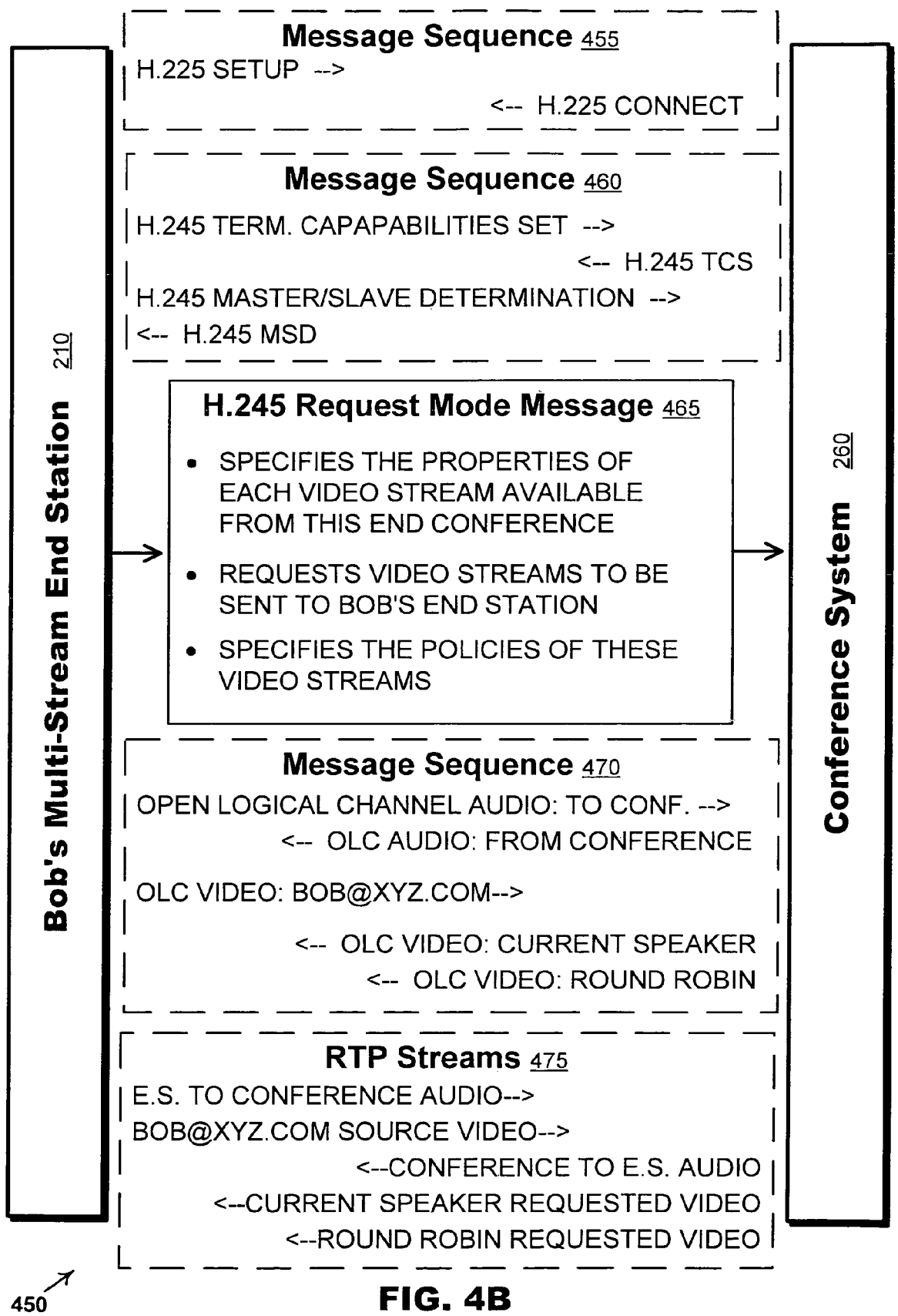

FIGS. 4A and 4B show the conference control messages that are sent back and forth when multi-stream end station 210 enters a conference. FIG. 4A illustrates an embodiment of the invention that uses session initiation protocol (SIP) and session description protocol (SDP) call control messages. FIG. 4B illustrates another embodiment of the invention that uses H.323 and H.245 call control messages. In these figures, core conference system 260 provides the conference services. Typically, but not necessarily, conference server 250, within system 260, receives and responds to the call control messages shown in FIGS. 4A and 4B.

In FIG. 4A, message sequence 400 includes: a SIP INVITE message, which in turn contains a SDP offer body 410; a SIP response message, which in turn contains an SDP answer body 415; and a SIP ACK message 420. Message sequence 400 also shows the audio streams 425 and 435, and video streams 430, 440, and 445, that result from the call control messages shown.

These audio and video streams convey the conference via the real time transport (RTP) protocol. The SIP, SDP, and RTP standards are defined by the IETF, specifically, these include RFC 3261, RFC 2327 and RFC 3550, respectively.

End station 210, which is being used by a participant whose SIP URI is Bob@xyz.com, uses SIP INVITE message with embedded SDP offer body 410 to inform the conference of the audio and video streams that can be sent and received by the end station 210. The embedding of an SDP body with the SIP INVITE message is accomplished according to the mechanisms described in RFC3261 and RFC3264. Specifically, the SDP describes all source and requested audio and video streams associated with the conference participant. For example, message 410 requests the two video streams that the user Bob has configured end station 210 to display. Specifically, this message requests a video stream with a policy of showing the current speaker, and another video stream with a policy of showing a round robin of all conference participants on a 30 second timer.

Conference system 260 uses SIP response with embedded SDP answer body message 415 to inform the end station that the conference will supply the requested streams. In this example, the SIP response code is a 200, indicating that the call to the conference system 260 has been accepted.

FIG. 4A illustrates at an abstract level an extension to the current version of the SDP standard. In SDP, an overall "session" consists of a set of zero or more "media descriptions", where each media description represents a possible media stream. Each media description defines the type of media stream (audio, video, data, etc.), the transport to be used in conveying the media stream (in the illustrated embodiment, this is RTP), addressing information about where the endpoint would like to receive the stream, and a set of attributes. These attributes are sometimes called "A-lines," "A-line attributes," or "attribute lines" because of their format. Specifically, each such attribute is expressed in SDP using the format "a=<attribute>:<attribute-specific parameters>". Existing standardized SDP attribute lines are used to define the directionality of video or audio streams (e.g., sendrecv, sendonly, recvonly) and to define supported media formats.

In some embodiments of the invention, each video stream requested by a multi-stream endpoint will have a separate media description, and each media description will have a new attribute indicating the control policy to be applied to that stream. Such an attribute could have any format that conveys the necessary policy information.

In one embodiment of the invention, SDP attribute lines are used that have the syntax shown in Table 3:

TABLE 3

SDP Attribute Line Extensions for Video Stream Control Policy Attributes

| SDP Attribute Line Syntax | Description |
| --- | --- |
| a=vidsource:recent-speaker <n> where <n> is a number greater than or equal to 1. | Make this stream contain the video image of $N^{th}$ most recent speaker. If <n> is 1, display the current speaker. If 2, display the second most recent speaker. If 3, display the third most recent speaker, and so on. If this stream would contain the image of the participant requesting to receive this stream, skip that stream and go to the next most recent stream. This prevents participants from seeing themselves speak, which can be very distracting. |
| a=vidsource:roster <roster-ID> where <roster-id> is a string. | Make this stream contain the video image of the participant specified by <roster-ID>. In some embodiments of the invention, |

TABLE 3-continued

SDP Attribute Line Extensions for Video Stream Control Policy Attributes

| SDP Attribute Line Syntax | Description |
| --- | --- |
| | <roster-ID> is a SIP URI, but it can be in any format that the conference system recognizes. |
| a=vidsource:round-robin <timer-interval> <roster-ID-set> where <timer-interval> is a number of seconds and <roster-set> is an optional, whitespace delimited set of strings | Make this stream contain the video image of each of the participants in the roster set. Make each image be displayed in sequence for the specified time interval. If the roster set is omitted, it should default to all video participants in the conference. Any participant currently being displayed on the same endpoint via some other stream should be skipped over. |
| a=vidsource:most-motion <n> where <n> is a number greater than or equal to 1. | Make this stream contain the video image with the $N^{th}$ greatest amount of motion. If <n> is 1, the stream should contain the image with the most motion. If 2, the second-most motion, and so on. |
| a=vidsource:least-motion <n> where <n> is a number greater than or equal to 1 | Make this stream contain the video image with the $N^{th}$ least amount of motion. If <n> is 1, the stream should contain the image with the least motion. If 2, the second-least motion, and so on. |
| a=vidsource:motion-threshold-exceeded <motion-threshold> <roster-ID-set> where <motion-threshold> is a numeric amount of motion and <roster-set> is an optional, whitespace delimited set of strings | Make this stream contain the video image of any of the participants in the roster ID set whose current video stream has an amount of motion that exceeds the threshold value. If the roster ID set is omitted, it should default to all video participants in the conference. |
| a=vidsource:app-user [<app-name>] <n> where <n> is a number greater than or equal to 1 and [<app-name>] is an optional string representing the application name. | Make this stream contain the image of the participant who is currently using or controlling the application shared in the conference. In some embodiments of the invention, multiple applications can be shared (and selected by including an application name on this SDP A-line), or the $N^{th}$ most recent user can be specified (and selected by including a number on this SDP A-line). |
| a=vidsource:moderated <stream-name> where <stream-name> is a string representing a label defined by a moderator | Make this stream contain the image of the participant that is dynamically mapped to this label by a conference moderator. |
| a=vidsource:closest-to-participant <n> <roster-ID> where <n> is a number greater than or equal to 1 and <roster-id> is a string representing a participant | Make this stream contain the image of the participant whose end station is geographically the $N^{th}$ closest to the participant specified by the roster ID. If <n> is 1 the stream should contain the image closest to the end station. If <n> is 2, the second closest, and so on. If the roster ID is omitted, it should default to the participant requesting this video stream. |
| a=vidsource:closest-to-location <n> <location> where <n> is a number greater than or equal to 1 and <location> is a string representing a location | Make this stream contain the image of the participant whose end station is geographically the $N^{th}$ closest to the requesting end station. If <n> is 1 the stream should contain the image closest to the end station. If <n> is 2, the second closest, and so on. In some embodiments, the location is a GPS coordinate, but it can be in any format that the conference system recognizes. |
| a=vidsource:external-event <event-name> <n> where <event-name> is a string describing the external event for the associated with the source stream, and <n> is a number greater than or equal to 1. | Make this stream contain the image of the participant who has $N^{th}$ most recently had the named event associated with it. For example, a=vidsource:external-event doorbell 2 would request the video stream whose end station had its doorbell pressed $2^{nd}$ most recently. |

Contrary to the layout of Table 3, SDP attribute lines may not span multiple lines. Neither the attributes nor the syntax shown in Table 3 are part of the current SDP standards and definitions.

In other embodiments of the invention, other SDP attribute line syntaxes may be used. In still other embodiments, a mechanism within SDP other than the attribute line may be used to convey policy information for some or all of the requested video streams.

In some embodiments, a video policy is specified and expressed within the SIP protocol, but via a syntax or mechanism other than SDP. In one such embodiment, each requested video stream has a video policy associated with it by including a SIP header containing the policy information. In yet another embodiment, the video policy information is included in a non-SDP, multi-purpose Internet mail extensions (MIME)-encoded body part, using a syntax specific to that body.

The conference control messages shown in FIG. 4B illustrate an embodiment of the invention that uses the H.323 standard as defined by the International Telecommunication Union Standardization Sector (ITU-T). More precisely, H.323 is a suite of related, interoperating protocols including, but not limited to: the H.225 call signaling protocol and media stream packet protocol; the H.225/RAS registration, admission and status (RAS) protocol; and the H.245 control protocol for multimedia communication.

The conference control messages shown in FIG. 4B include H.225 call establishment message sequence 455, H.245 capability exchange message sequence 460, H.245 RequestMode message sequence 465, and H.245 logical channel establishment message sequence 470. FIG. 4B also shows RTP streams 475, which illustrate the source video streams, requested video streams, source audio streams, and requested audio streams that result from the preceding call control messages. Many of the conference control messages shown in FIG. 4B result in an acknowledgement message being sent from the recipient of that message, but for clarity these are elided from FIG. 4B.

Message sequence 455 is intended to establish the call, or the connection between the end station 210 and the conference. Sequence 455 includes: an H.225 setup message sent from end station 210 to core conference system 260 and an H.225 connect message sent from the server. This sequence is the bare minimum needed to establish a call in H.323; as understood by those skilled in the art, other embodiments of the invention may require longer or more sophisticated message exchanges according to the H.225 specification.

Message sequence 460 is intended to exchange information between the end station 210 and the conference as to the capabilities that each has for sending and receiving multimedia conference streams. Sequence 460 includes: a first H.245 terminal capability set message sent from the end station; a second H.245 terminal capability set message sent from the server; a first master/slave determination message sent from the end station, and a second master/slave determination message sent from the server. For clarity, the corresponding terminal capability set acknowledge and master/slave determination acknowledge messages are elided from FIG. 2.

In message sequence 460, the end station 210 sends an extension to the H.245 RequestMode message, which specifies the video streams to be sent from the conference system 260 to the end station 210 and control policies for the video streams. The details of the extension to the request mode message are omitted, but they would convey the same sorts of policy information as the SDP attributes in Table 2, albeit in a substantially different syntax and encoding. For clarity, the corresponding request mode acknowledge message is elided from FIG. 2.

In message sequence 465, end station 210 opens a logical audio channel with the core conference system 260, and system 260 opens a logical audio channel with the end station, resulting in bi-directional audio establishment. The end station then establishes a send-only video stream with the conference server. The corresponding open logical channel acknowledgement messages are elided from the figure in the interests of clarity. The server uses the information received in the request mode message sequence 460 to open the proper number of requested video channels from the server to the end station.

The above described H.323 conference control messages result in RTP streams 475 being sent between end station 210 and conference system 260. These streams are equivalent to those shown in FIG. 4A. Each of the requested video streams will be created using source video streams according to the video policies specified during the request mode message sequence 460.

Figure 5:
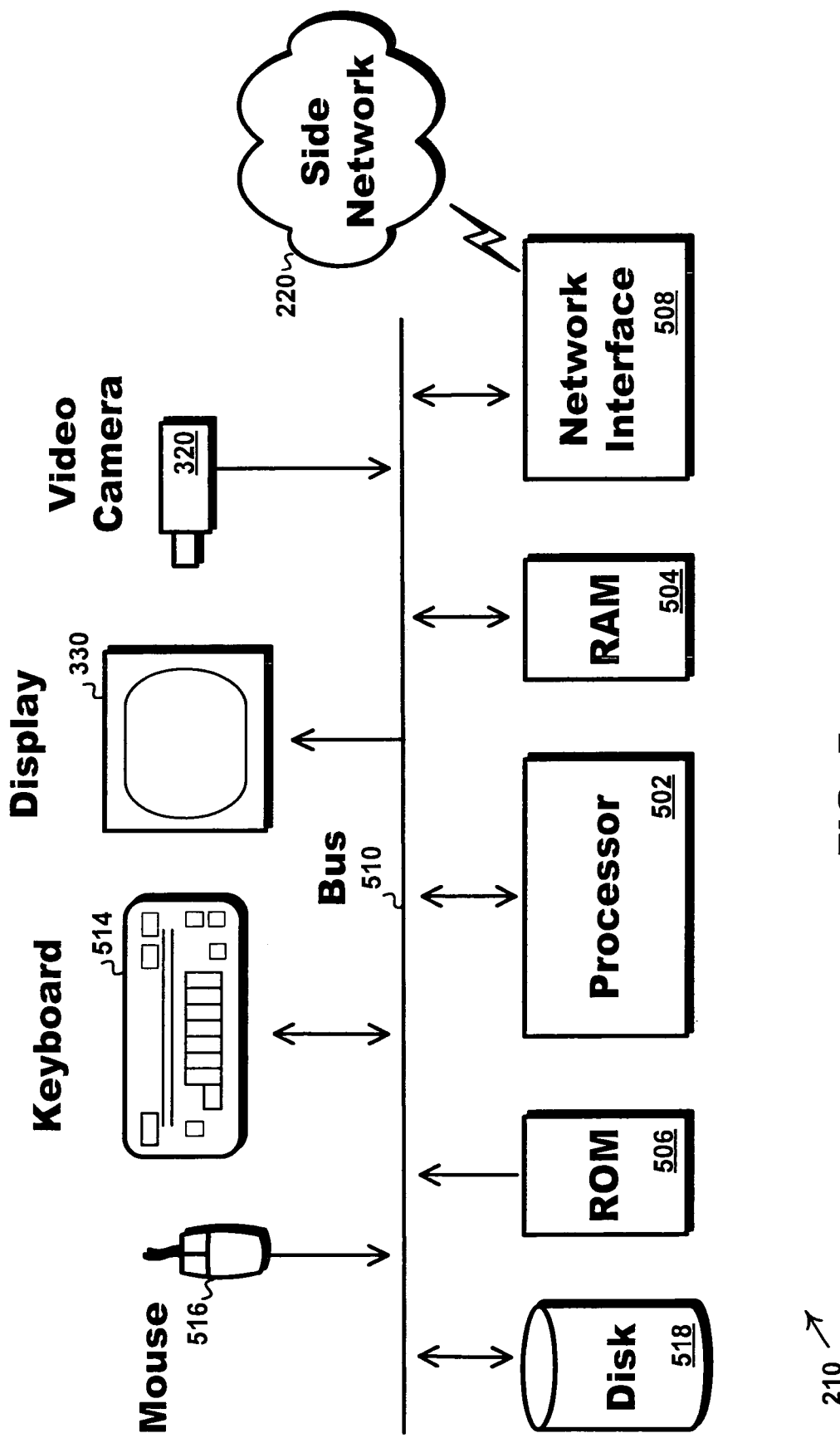
FIG. 5 shows the components and their interconnections within a multi-stream end station, according to an embodiment of the invention.

FIG. 5 is a structural block diagram of multi-stream end station 210. Additionally, various embodiments of the invention may use devices that are structured as shown in FIG. 5 in various ways, for example, as a network access device 230, a conference server 250, a directly connected end station 270, a video stream compositor 280, a uni-stream end station 290, a host, a server, or the like. These devices are further described with reference to FIG. 2 above.

Multi-stream end station 210 includes one or more buses 510 configured to communicate information, such as addresses, operation codes, or data. The computer system also comprises one or more processors 502 configured to process information and data according to instructions and other data. The processor may be, but is not limited to: a central processing unit; a microprocessor; an embedded processor; or a special purpose processor.

Multi-stream end station 210 includes display 330, that is, one or more devices or circuits configured to display pictures, video, text, or graphics. Display 330 may include, but is not limited to one or more of: a cathode ray tube (CRT); a flat panel display; a liquid crystal display (LCD); a field emission display (FED); or a heads up display suitable for use in a vehicle. Display 330 is coupled to bus 510.

Multi-stream end station 210 includes video camera 320, that is, one or more devices or circuits configured to capture video images of the user of the end station, conference participants near the end station, or both.

Multi-stream end station 210 may optionally include RAM 504, that is, one or more volatile memory units, devices or circuits configured to store information, data or instructions. RAM 504 may be but is not limited to random access memory (RAM), static RAM, or dynamic RAM. RAM 504 is coupled to bus 510.

Multi-stream end station 210 may optionally include ROM 506, that is, one or more non-volatile memory units or other devices or circuits configured to store static information and instructions. ROM 506 may include, but is not limited to one or more of: read only memory (ROM), programmable ROM, flash memory, electrically programmable ROM (EPROM), or erasable electrically programmable ROM (EEPROM). ROM 506 is coupled with bus 510.

Multi-stream end station 210 may optionally include network interface and interconnect 508, that is, one or more devices or circuits configured to interface with one or more other electronic devices via one or more networks 530. One or more of networks 530 may function as a side network 220, or as a network within the core conference system 260, as described with regard to FIG. 2. Network interface and interconnect 508 is coupled to bus 510. Network interface and interconnect 508 may optionally perform one or more of switching, routing, bridging, or relay functions among networks 530. Networks 530 may include, but are not limited to, one or more of: Internet protocol (IP) networks, asynchronous transfer mode (ATM) networks, frame relay networks, time division multiplexing (TDM) networks, or the public switched telephone network (PSTN).

Multi-stream end station 210 may optionally include keyboard 514, that is, one or more alphanumeric input devices configured to communicate information and command selections from a user. Keyboard 514 may, for example, have alphabetic, numeric, function and control keys, buttons, selectors or touch-sensitive screens. The keyboard is coupled to bus 510. Alternatively, or additionally, the functions of keyboard 514 may be directed or activated via input from mouse 516 using special menus, click sequences, or commands.

Multi-stream end station 210 may optionally include mouse 516, that is, one or more cursor control, indicating, selecting, pointing, or control devices configured to communicate analog, quantitative or selection user input information and command selections to processor 502. Mouse 516 may include, but is not limited to one or more of: a mouse, a track ball, a touch pad, an optical tracking device, a joystick, a game controller, a touch screen, or a glove. The mouse is coupled to bus 510. Alternatively, or additionally, the functions of mouse 516 may be directed or activated via input from keyboard 514 using special keys, key sequences or commands.

Multi-stream end station 210 may optionally include disk 518, that is, one or more devices or circuits configured to store information, data or instructions. Disk 518 may include, but is not limited to, one or more of: a mass storage device, a magnetic disk, an optical disk, a compact disk (CD), a writeable CD, a digital versatile disk (DVD), a hard disk, a floppy disk, a flash memory, or a memory stick. Disk 518 is coupled to bus 510.

Although the invention has been described with respect to specific embodiments thereof, these embodiments are merely illustrative, and not restrictive of the invention. For example, network 100 and devices 200, and 500, as shown in FIGS. 1, 2, and 5, are only illustrative. The invention may be embodied in network systems and devices with more or fewer components, other types of components, or other interconnection schemes. Further, processes 300 and 400 are only illustrative examples. The invention may be embodied in network processes with more or fewer activities, other types of activities, and other control flows or concurrencies among the activities.

Although the invention has been described with respect to specific embodiments thereof, these embodiments are merely illustrative, and not restrictive of the invention. For example, the windows within display 100, the conference network 200, the conference system 260, and the end station 210, as shown in FIGS. 2, 3 and 5 are only illustrative. The invention may be embodied in systems and devices with more or fewer components, other types of components, or other interconnection schemes.

Further, the messages, protocols, and information content described in regard to FIGS. 4A and 4B are only illustrative examples. The invention may be embodied in devices, methods, or systems that use other messages, protocols, or information content.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. An end station comprising:
a controller configured to form a connection to a conference via exchanging a series of call control messages with the conference, where the series includes at least one request that the conference send to the end station at least one video stream, where at least one of the requests specifies a video policy for the requested video stream, and where the video policy controls which source of video streams is selected from the requested video stream, and wherein the end station is configured to identify a roster of participants having an associated roster identifier (ID), and wherein the end station is configured to select a first video stream based on a first roster ID, and to select a second video stream corresponding to a current speaker or a previous speaker of the conference;
a transmitter configured to send outgoing call control messages to the conference;
a receiver configured to receive incoming call control messages from the conference and to receive each of the requested video streams that are sent from the conference;
a decoder configured to decode each received video stream into a decoded video stream; and
a display configured to simultaneously display each decoded video stream.

2. The end station of claim 1, where the controller is further configured to follow a version of the session initiation protocol (SIP) standard with respect to the call control messages that form the conference connection and request the video stream.

3. The end station of claim 2, where the controller is further configured to follow a version of the session description protocol (SDP) standard with respect to the video stream request.

4. The end station of claim 3, where the controller is further configured to specify the video policy of the requested video stream via an SDP attribute line.

5. The end station of claim 1, where the controller is further configured to follow a version of the H.323 standard with respect to the call control messages that form the conference connection.

6. The end station of claim 5, where the controller is further configured to follow a version of the H.245 standard with respect to the video stream request.

7. The end station of claim 6, where the controller is further configured to generate a request mode message that follows a version of the H.245 standard, and to specify the video policy of the requested video stream via the request mode message.

8. The end station of claim 1, where at least one of the video stream requests specifies a video policy that changes, over time during the conference, which source video stream is selected for that requested video stream.

9. The end station of claim 1, where at least one of the video stream requests specifies a video policy that selects the source video stream corresponding to a participant, who is specified to be an $N^{th}$ most recent participant to speak.

10. The end station of claim 1, where:
the conference further includes at least one display generated by at least one shared application; and
at least one of the video stream requests specifies a video policy that selects the source video stream corresponding to a participant, who is specified to be an $N^{th}$ most recent participant to control the shared application.

11. The end station of claim 1, where:
the conference further includes at least one moderator and at least one video stream that is selected by the moderator during the conference; and
at least one of the video stream requests specifies a video policy that selects the video stream that is selected by the moderator.

12. The end station of claim 1, where at least one of the video stream requests specifies a set of the participants and a video policy that selects the source video stream that corresponds to one of the set of participants, where a currently selected participant changes over time during the conference.

13. The end station of claim 1, where at least one of the video stream requests specifies a video policy that selects a source video stream, where the source video stream is selected that currently has the $N^{th}$ most amount of motion.

14. The end station of claim 1, where at least one of the video stream requests specifies a video policy that selects a source video stream, where the source video stream is selected that currently has the $N^{th}$ least amount of motion.

15. The end station of claim 1, where at least one of the video stream requests specifies a threshold amount of motion and specifies a video policy that selects a source video stream, where the source video stream currently selected is based on comparing the threshold amount of motion with the amount of motion in at least one of the source video streams.

16. The end station of claim 1, where at least one of the video stream requests specifies a video policy that selects the source video stream based on a measurement of an activity that changes over time and corresponds to at least one of the source video streams.

17. The end station of claim 1, where at least one of the video stream requests specifies a video policy that selects the source video stream based on a global positioning system (GPS) measurement of the position of at least one object that corresponds to at least one of the source video streams.

18. A system, comprises:
means for forming a connection to a conference including
    means for exchanging a series of call control messages with the conference, where the series includes at least one request that the conference send to an end station at least one video stream, where at least one of the requests specifies a video policy for each requested video stream, and where the video policy controls which source video streams is used for the requested video stream, and wherein the end station is configured to identify a roster of participants having an associated roster identifier (ID), and wherein the end station is configured to select a first video stream based on a first roster ID, and to select a second video stream corresponding to a current speaker or a previous speaker of the conference;
means for transmitting outgoing call control messages to the conference;
means for receiving incoming call control messages from the conference;
means for receiving each of the requested video streams that are sent from the conference;
means for decoding each received video stream into a decoded video stream; and
means for simultaneously displaying each decoded video streams.

19. Non-transitory computer readable media containing instructions that when executed control a process comprising:
forming a connection to a conference including:
    exchanging a series of call control messages with the conference, where the series includes at least one request that the conference send to an end station at least one video stream; and
    specifying in the request a video policy for each requested video stream, where the video policy controls which source video streams is used for the requested video stream, and wherein the end station is configured to identify a roster of participants having an associated roster identifier (ID), and wherein the end station is configured to select a first video stream based on a first roster ID, and to select a second video stream corresponding to a current speaker or a previous speaker of the conference;
transmitting outgoing call control messages to the conference;
receiving each requested video stream from the conference;
receiving incoming call control messages from the conference;
decoding each requested video stream thereby generating a decoded video stream; and
displaying simultaneously each decoded video stream.

20. A method, comprises:
forming a connection to a conference including:
    exchanging a series of call control messages with the conference, where the series includes at least one request that the conference send to an end station at least one video stream; and
    specifying in at least one of the requests a video policy for at least one of the requested video streams, where the video policy controls which source video streams is used for the requested video stream, and wherein the end station is configured to identify a roster of participants having an associated roster identifier (ID), and wherein the end station is configured to select a first video stream based on a first roster ID, and to select a second video stream corresponding to a current speaker or a previous speaker of the conference;
transmitting outgoing call control messages to the conference;
receiving incoming call control messages from the conference;
receiving the requested video streams that are sent from the conference;
decoding each received video stream, thereby generating a decoded video stream; and
displaying simultaneously each decoded video stream.

21. The method of claim 20, where the forming of the connection and the generating of the series of call control messages follow a version of the session initiation protocol (SIP) standard.

22. The method of claim 21, where the video stream request follows a version of the session description protocol (SDP) standard.

23. The method of claim 22, where the specifying of the video policy includes generating an SDP attribute line.

24. The method of claim 20, where the forming of the connection follows a version of the H.323 standard.

25. The method of claim 24, where the video stream request follows a version of the H.245 standard.

26. The method of claim 25, where the specifying of the video policy includes generating a request mode message that follows a version of the H.245 standard, and specifying the video policy via the request mode message.

27. The method of claim 20, where at least one of the video stream requests includes specifying a video policy that changes, over time during the conference, which source video stream is selected for that requested video stream.

* * * * *